United States Patent
Hiwatashi (10) Patent No.: US 8,627,919 B2
(45) Date of Patent: Jan. 14, 2014

(54) SPEAKER AND PORTABLE INFORMATION TERMINAL

(75) Inventor: Hideki Hiwatashi, Yao (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 53 days.

(21) Appl. No.: 13/332,547

(22) Filed: Dec. 21, 2011

(65) Prior Publication Data

US 2012/0152648 A1   Jun. 21, 2012

(30) Foreign Application Priority Data

Dec. 21, 2010   (JP) .................................. 2010-284403

(51) Int. Cl.
  *H05K 5/00* (2006.01)
  *H04R 1/02* (2006.01)
(52) U.S. Cl.
  USPC ............ 181/148; 181/151; 181/153; 381/386
(58) Field of Classification Search
  USPC ........................... 181/148, 151, 153; 381/386
  See application file for complete search history.

(56) References Cited

U.S. PATENT DOCUMENTS

| | | | | |
|---|---|---|---|---|
| 3,892,930 | A * | 7/1975 | Wieder | 340/629 |
| 4,845,760 | A * | 7/1989 | Awakowicz et al. | 381/392 |
| 6,675,930 | B2 * | 1/2004 | Sugiyama et al. | 181/148 |
| 7,221,772 | B2 * | 5/2007 | Evenisse et al. | 381/386 |
| 7,743,877 | B2 * | 6/2010 | Saiki et al. | 181/151 |
| 8,073,184 | B2 * | 12/2011 | Horigome et al. | 381/386 |
| 8,335,333 | B2 * | 12/2012 | Saiki et al. | 381/345 |
| 2001/0045320 | A1 * | 11/2001 | Sugiyama et al. | 181/153 |
| 2002/0150271 | A1 * | 10/2002 | Sugiyama et al. | 381/386 |
| 2003/0077945 | A1 * | 4/2003 | Hashiba | 439/660 |
| 2006/0198546 | A1 * | 9/2006 | Sasaki et al. | 381/391 |
| 2006/0274907 | A1 * | 12/2006 | Watanabe | 381/150 |
| 2007/0049326 | A1 * | 3/2007 | Kim | 455/550.1 |
| 2008/0298628 | A1 * | 12/2008 | Lim | 381/386 |
| 2009/0028370 | A1 * | 1/2009 | Matsumura et al. | 381/386 |
| 2009/0120715 | A1 * | 5/2009 | Saiki | 181/151 |
| 2009/0123017 | A1 * | 5/2009 | Suzuki et al. | 381/386 |
| 2009/0168024 | A1 * | 7/2009 | Hayashi | 353/15 |
| 2009/0285439 | A1 * | 11/2009 | Yuasa et al. | 381/412 |

(Continued)

FOREIGN PATENT DOCUMENTS

| | | | | |
|---|---|---|---|---|
| EP | 2120483 | A2 * | 11/2009 | H04R 7/22 |
| JP | 2002252897 | A * | 9/2002 | H04R 9/02 |
| JP | 2002-291094 | A | 10/2002 | |
| JP | 2009-278213 | A | 11/2009 | |

*Primary Examiner* — David Warren
*Assistant Examiner* — Christina Russell
(74) *Attorney, Agent, or Firm* — Westerman, Hattori, Daniels & Adrian, LLP (57) ABSTRACT

A speaker has a speaker unit and a box. The speaker unit has a speaker unit side terminal. The box includes a casing having an internal space, and a box side terminal arranged in the casing so as to be in close contact with the casing. Under the condition that the speaker unit is housed in the internal space, a first terminal serving as one of the speaker unit side terminal and the box side terminal has a projection, a second terminal serving as the other thereof surrounds and sandwiches an outer periphery of the projection from at least both sides, and the first terminal and the second terminal are electrically connected with soldering. Thus, it is possible to obtain the speaker which can improve workability on a connection between the speaker unit and the box and save a space, and the portable information terminal provided with the speaker.

7 Claims, 6 Drawing Sheets

(56) References Cited

U.S. PATENT DOCUMENTS

| | | | |
|---|---|---|---|
| 2011/0200223 A1* | 8/2011 | Hiwatashi et al. | 381/400 |
| 2012/0139367 A1* | 6/2012 | Funaki et al. | 310/28 |
| 2012/0195456 A1* | 8/2012 | Hiwatashi | 381/386 |

* cited by examiner

SPEAKER AND PORTABLE INFORMATION TERMINAL

This nonprovisional application is based on Japanese Patent Application No. 2010-284403 filed on Dec. 21, 2010 with the Japan Patent Office, the entire contents of which are hereby incorporated by reference.

BACKGROUND OF THE INVENTION

1. Field of the Invention

The present invention relates to a speaker and a portable information terminal, and more particularly, to a speaker having a speaker unit and a box, and a portable information terminal including the same.

2. Description of the Related Art

A speaker is mounted in a portable information terminal such as a mobile phone, smartphone, PDA (Personal Digital Assistants), game machine, or personal computer. Recently, a high sound quality is required in the speaker mounted in the portable information terminal.

When a sound produced from a rear surface of a diaphragm of the speaker comes around to a front surface, a sound produced from the front surface and the sound produced from the rear surface interfere with each other and negated, so that a sound quality is lowered. Since the interference is great in a region having a low frequency, the sound quality is lowered in a low sound especially. As a method to prevent the interference of the sound produced from the rear surface of the diaphragm with the sound produced from the front surface thereof, the rear surface of the diaphragm is hermetically sealed to block out the sound produced from the rear surface of the diaphragm.

Meanwhile, when a volume of a space arranged on the rear surface of the diaphragm is small, a vibration of the diaphragm is prevented due to air resistance in the space. When the rear surface of the diaphragm is simply hermetically sealed as described above, the volume of the space arranged on the rear surface of the diaphragm cannot be ensured, so that the vibration of the diaphragm is prevented due to the air resistance in the space. Therefore, the sound quality is lowered.

Therefore, there is a method in which to increase the volume of the space arranged on the rear surface of the diaphragm while preventing the sound interference, the speaker unit is arranged in a box having the space arranged on the rear surface of the diaphragm, and the box blocks out the sound produced from the rear surface of the diaphragm.

In this case, the speaker unit having the diaphragm, a voice coil, a magnet, and a frame is mounted in the box. In this state, a lead connected to the voice coil is connected to a wire led out of the frame. This wire is routed in the box, and led out of the box through a through hole provided in the box.

Various configurations are proposed for a terminal of the speaker unit. For example, Japanese Patent Laying-Open No. 2002-291094 discloses a speaker mount structure having a terminal pin to which an end of a lead extending from the voice coil is fixed. According to this speaker mount structure, the terminal pin is connected to a conductive section (conductive pattern) of a substrate with soldering under the condition that it is inserted into a pin insert hole, and the terminal pin and the conductive section are electrically connected.

In addition, Japanese Patent Laying-Open No. 2009-278213 discloses an electroacoustic transducer in which a lead led out of the voice coil is connected to an external connection terminal with soldering. According to this electroacoustic transducer, the external connection terminal is formed on a resin insulator fixed to a bottom plate of a frame by insert molding, and it has a fixed section to be buried in the resin, and a spring piece having a cantilever shape extended obliquely downward from the fixed section.

According to the speaker having the speaker unit mounted in the box, in some cases, a wire connected to the speaker unit is led out of the box through a hole provided in the box. In this case, since it is necessary to hermetically seal the hole with a bonding agent under the condition that the wire is led out, the problem is that workability is not good. In addition, when an amount of the bonding agent is small at the time of hermetically sealing the hole with the bonding agent, the sealing is likely to be insufficient, and the problem is that the sound quality becomes unstable due to sound interference. Meanwhile, when the amount of the bonding agent is excessive, the sound quality becomes unstable because a volume ratio of the bonding agent increases in the box.

In addition, according to the speaker having the speaker unit mounted in the box, it is necessary to perform a routing operation for the wire in the box. The routing operation for the wire needs many processes, so that the number of processes increase. That is, the problem is that the workability is not good. In addition, when the routed wire comes into contact with the speaker unit and the box, an abnormal sound is generated. Therefore, the problem is that the sound quality becomes unstable. In addition, hermetically sealed volume in the box decreases due to the volume of the routed wire, so that a sound pressure deteriorates. Thus, the problem is that the sound quality becomes unstable.

In addition, according to the speaker having the speaker unit mounted in the box, in some cases, a terminal provided in the box is connected to the wire in the box, instead of leading out the wire from the box. In this case, it is necessary to connect both ends of the wire. Since the operation to connect the wire needs many processes, the number of the processes increases because the both ends of the wire are connected. Thus, the problem is that the workability is not good.

When the speaker unit and the box are connected with the wire, the above problems arise, so that it is considered that the speaker unit and the box are directly connected without using the wire. In this case, it is necessary to align a terminal of the speaker with a terminal of the box, but the problem is that it is difficult to align the positions because dimensional precision of each component is limited. Since it is difficult to align the positions when the speaker unit and the box are directly connected, the problem is that the workability is not good. Therefore, it is difficult to directly connect the speaker unit and the box without using the wire.

Thus, it is considered that the speaker unit and the box are connected with the terminal pin instead of using the wire as disclosed in the Japanese Patent Laying-Open No. 2002-291094. However, the speaker mount structure in this document is not a structure in which the speaker unit is arranged in the box, so that the pin terminal becomes a hindrance in mounting the speaker. Therefore, the problem is that the workability is not good in this case also. In addition, since the pin terminal is provided outside the speaker, a range occupied by the speaker increases. Thus, the problem is that the space cannot be saved.

Furthermore, it is considered that instead of using the wire, the speaker unit and the box are connected with the external connection terminal having the spring piece as disclosed in the above Japanese Patent Laying-Open No. 2009-278213. However, the external connection terminal having the spring piece in this document has problems such as a conduction defect caused by the separation of a contact point of the spring piece due to the vibration, a conduction defect caused by plastic deformation of the spring piece, and a conduction defect caused by a stain of the contact point of the spring piece. In addition, the problem is that a mount position shifts due to a reaction force of the spring piece.

Therefore, a mechanism or an operation to hold a position of the spring piece so as to prevent the above conduction defect and to prevent the mount position from shifting is needed in mounting the speaker unit in the box. In addition, it is necessary to limit a position of a rear hole of the frame and enlarge an outer diameter of the frame to ensure an area for the spring piece. Thus, the problem is that the space cannot be saved. In addition, the problem is that the workability is not good due to the above operation.

SUMMARY OF THE INVENTION

A speaker according to the present invention has a speaker unit and a box. The speaker unit includes a diaphragm, a voice coil mounted in the diaphragm, a magnet arranged so as to be opposed to the voice coil, a frame to support the magnet and the diaphragm, and a speaker unit side terminal electrically connected to the voice coil and projecting from the frame. The box has a casing having an internal space to house the speaker unit, and a box side terminal arranged in the casing so as to be in close contact with the casing and projecting to the internal space. Under the condition that the speaker unit is housed in the internal space, a first terminal serving as one of the speaker unit side terminal and the box side terminal has a projection, a second terminal serving as the other thereof surrounds and sandwiches an outer periphery of the projection from at least both sides, and the first terminal and the second terminal are electrically connected with soldering.

The foregoing and other features and aspects of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.
(First Embodiment)

First, a configuration of a speaker in a first embodiment of the present invention will be described.

Figure 1:
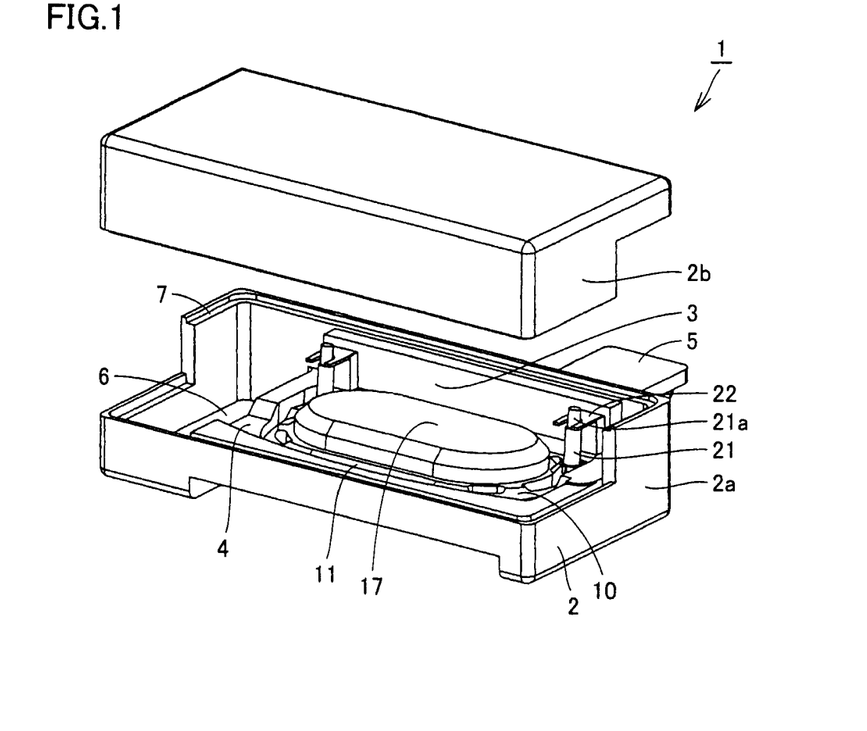
FIG. 1 is a schematic perspective view showing a state in which a second box unit is separated from a first box unit of a speaker in a first embodiment of the present invention.

With reference to FIG. 1, a speaker 1 mainly has a box 2 and a speaker unit 10. Speaker unit 10 is housed in an internal space 4 of box 2. A speaker unit side terminal 21 of speaker unit 10 and one end of a box side terminal 22 of box 2 are electrically connected with soldering. In addition, in FIG. 1, solder to connect speaker unit side terminal 21 and the one end of box side terminal 22 is not shown so as to be easily viewed. Similarly, in FIGS. 4 and 5, the solder to connect speaker unit side terminal 21 and the one end of box side terminal 22 is not shown.

Box 2 is configured by a first box unit 2a, and a second box unit 2b which are separable. Speaker unit 10 is mounted in first box unit 2a. Under the condition that speaker unit 10 is housed in internal space 4, second box unit 2b can engage with first box unit 2a and close internal space 4.

Figure 2:
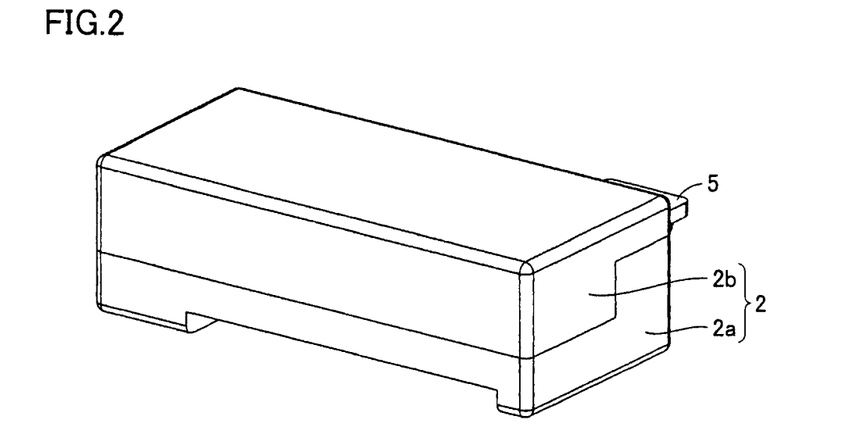
FIG. 2 is a schematic perspective view showing a state in which the second box is mounted in the first box of the speaker in the first embodiment of the present invention.

With reference to FIGS. 1 and 2, an engagement unit 7 is provided in an outer edge of first box unit 2a. An engagement groove (not shown) is provided also in an outer edge of second box unit 2b. First box unit 2a and second box unit 2b can engage with each other in the outer edges when engagement units 7 engage with each other. First box unit 2a and second box unit 2b can be hermetically sealed.

Figure 3:
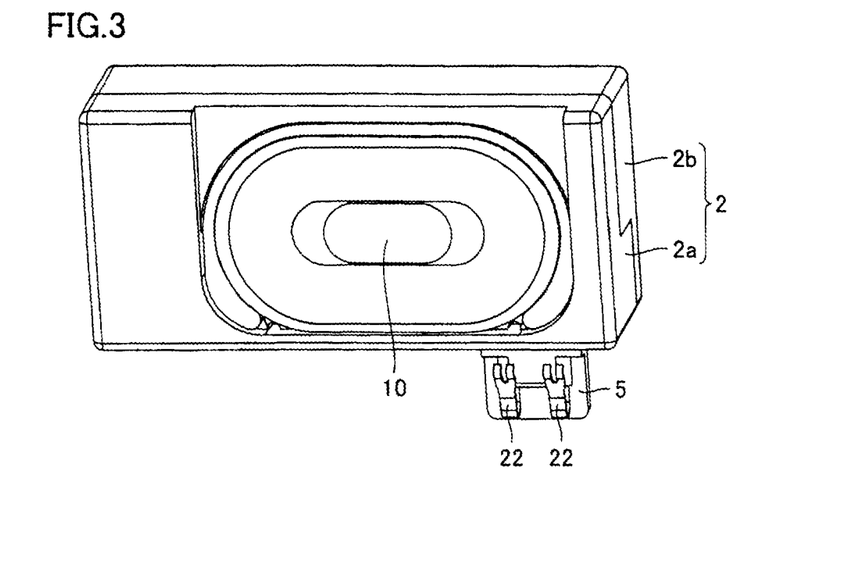
FIG. 3 is a schematic perspective view of the speaker viewed from a side of a speaker unit in the first embodiment of the present invention.

With reference to FIG. 3, speaker unit 10 is arranged such that at least one part is exposed on first box unit 2a. A speaker connector 5 is provided in a part of an outer periphery of box 2 to connect speaker 1 to an external device. The other end of box side terminal 22 is provided so as to be exposed to an outside of box 2. The other end of box side terminal 22 is provided in speaker connector 5.

Figure 4:
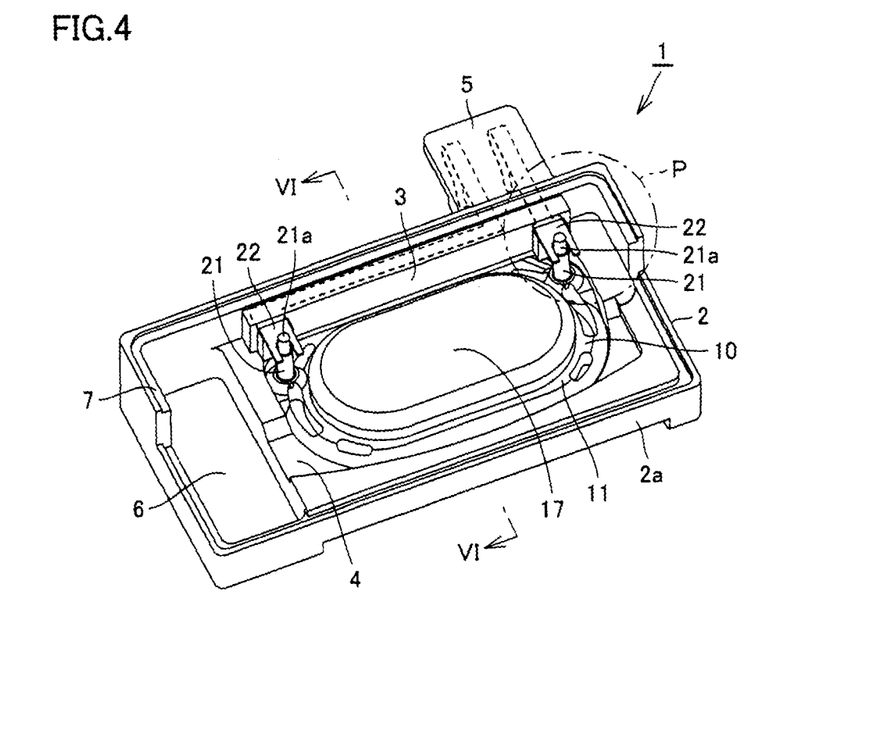
FIG. 4 is a schematic perspective view showing a state in which the speaker unit is mounted in the first box in the first embodiment of the present invention.

With reference to FIG. 4, box 2 has a casing 3, and box side terminal 22 arranged in casing 3. Internal space 4 is formed in an inner side of casing 3. When speaker unit 10 is housed in internal space 4, speaker unit 10 is mounted in box 2. Other than the region for housing speaker unit 10, a space region 6 to ensure a volume of box 2 is provided in internal space 4.

Box side terminal 22 is formed by insert molding in such a manner that a part of box side terminal 22 is provided inside casing 3. Box side terminal 22 is arranged in casing 3 so as to be in close contact with casing 3. The one end of box side terminal 22 is provided to project to internal space 4. Two box side terminals 22 are provided.

Figure 5:
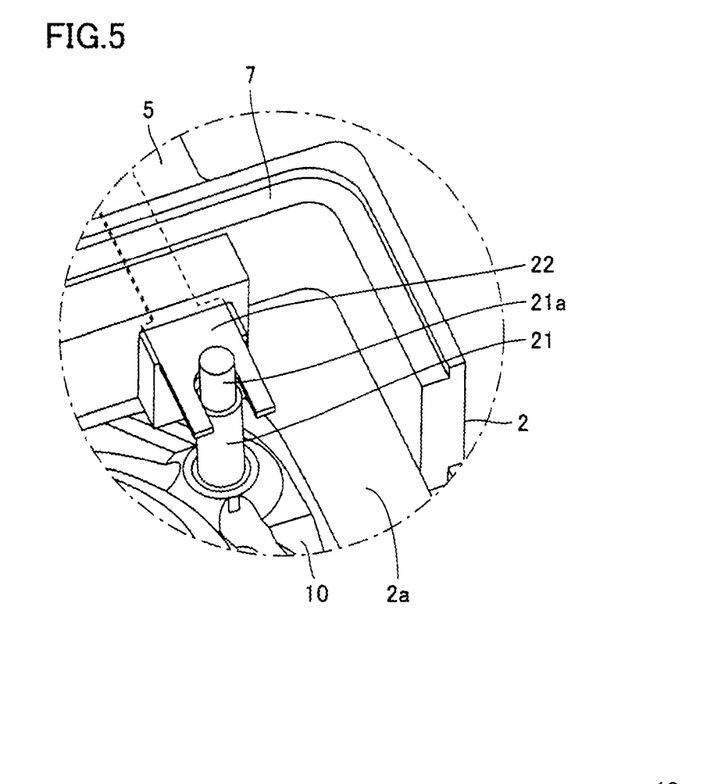
FIG. 5 is a schematic perspective enlarged view showing a part P in FIG. 4.

With reference to FIG. 5, speaker unit side terminal 21 has a projection 21a. Speaker unit side terminal 21 is formed into a shape such as a column shape. Speaker unit side terminal 21 may have columnar or prismatic shape. Speaker unit side terminal 21 may be formed such that an upper end is smaller in diameter than a lower end. Two speaker unit side terminals 21 are provided.

The one end of box side terminal 22 is formed into a recessed shape. Projection 21a is arranged in an inner side of the recessed part. Under the condition that speaker unit 10 is housed in internal space 4, box side terminal 22 surrounds and sandwiches an outer periphery of projection 21a in internal space 4. In this state, speaker unit side terminal 21 and box side terminal 22 are connected with soldering.

As for speaker unit side terminal 21 and box side terminal 22, under the condition that speaker unit 10 is housed in internal space 4, first terminal 21 serving as one of speaker unit side terminal 21 and box side terminal 22 has projection 21a in internal space 4, second terminal 22 serving as the other thereof surrounds and sandwiches the outer periphery of projection 21a from at least both sides, and first terminal 21 and second terminal 22 are electrically connected with soldering.

Figure 7:
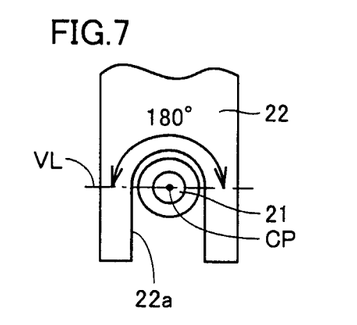
FIG. 7 is a schematic plan view showing an arrangement of a box side terminal and a speaker unit side terminal of the speaker in the first embodiment of the present invention.

With reference to FIG. 7, a detailed description will be made of the case where second terminal 22 surrounds and sandwiches the outer periphery of projection 21a from at least both sides. FIG. 7 shows an arrangement of speaker unit side terminal 21 and box side terminal 22 viewed from an extending direction of projection 21a. As for a virtual line VL which passes through a center CP of speaker unit side terminal 21 and extends in a diameter direction of speaker unit side terminal 21 when viewed from the extending direction of projection 21a, both ends of virtual line VL is arranged in an inner side of the recessed part of the one end of box side terminal 22. Virtual line VL has angles of 180° around center CP.

That is, the recessed part of the one end of box side terminal 22 is provided such that it can be arranged in a position of 180° around center CP of speaker unit side terminal 21 when viewed from the extending direction of projection 21a. Since the position of 180° around center CP of speaker unit side terminal 21 is surrounded by the recessed part when viewed from the extending direction of projection 21, projection 21a can be allowed to shift in a direction intersecting with the extending direction of projection 21a. That is, even when the position of projection 21a shifts to the direction intersecting with the extending direction of projection 21a to the extent that projection 21a is positioned in the inner side of the recessed part, the soldering can be preferably performed.

Therefore, the preferable soldering can be performed without requiring high mount precision and dimensional precision in speaker unit side terminal 21 and box side terminal 22 in the direction intersecting with the extending direction of projection 21. Even when speaker unit side terminal 21 extends at an oblique angle, it can be preferably connected to box side terminal 22 with soldering.

In addition, since the recessed part of the one end of box side terminal 22 is provided so as to sandwich the outer periphery of projection 21a from at least both sides in the direction intersecting with the extending direction of projection 21a, a shift of projection 21a in the extending direction of projection 21a is also allowed. Therefore, the preferable soldering can be performed without requiring high mount precision and dimensional precision in speaker unit side terminal 21 and box side terminal 22 in the extending direction of projection 21a. For example, even when speaker unit side terminal 21 shifts in height, it can be preferably connected to box side terminal 22 with soldering.

As described above, speaker unit side terminal 21 is first terminal 21, and box side terminal 22 is second terminal 22. However, box side terminal 22 may be the first terminal, and speaker unit side terminal 21 may be the second terminal. In this case, box side terminal 22 may be formed into the column shape, and speaker unit side terminal 21 may be formed into the recessed shape. Thus, box side terminal 22 has a projection, and speaker unit side terminal 21 surrounds and sandwiches an outer periphery of the projection.

Next, a structure of speaker unit 10 will be described in detail.

Figure 6:
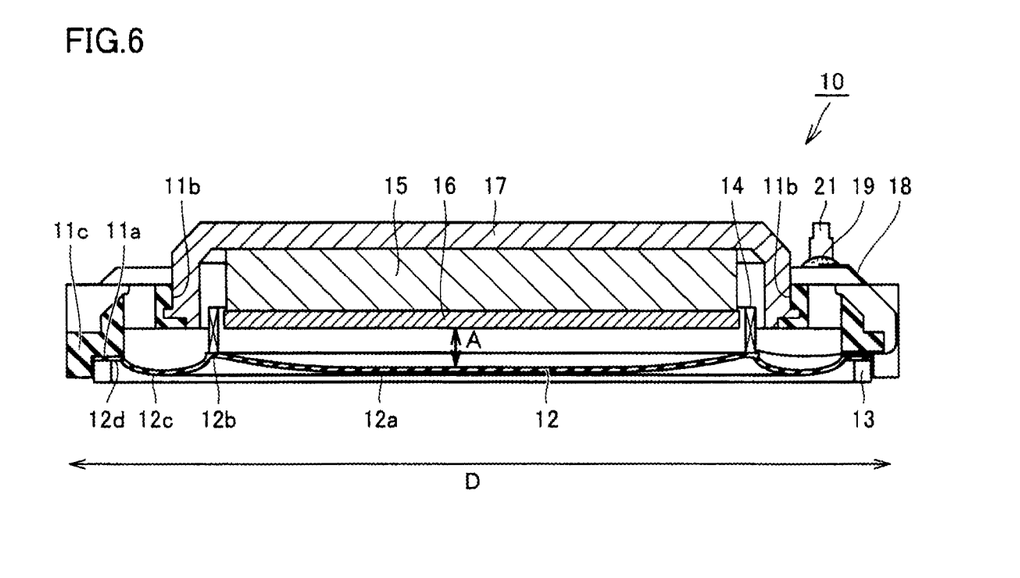
FIG. 6 is a schematic cross-sectional view of the speaker unit of the speaker in the first embodiment of the present invention taken along a line VI-VI in FIG. 4.

With reference to FIG. 6, speaker unit 10 mainly has a frame 11, a diaphragm 12, a diaphragm reinforcing ring 13, a voice coil 14, a magnet 15, a plate 16, a yoke 17, and speaker unit side terminal 21.

Frame 11 mainly has a support section 11a, an inner periphery section 11b, and an outer periphery section 11c. A rear hole is provided in frame 11. An outer periphery end of diaphragm 12 is supported by support section 11a, so that diaphragm 12 is vibratably supported by frame 11. There may be a difference in level between support section 11a and inner periphery section 11b.

In addition, frame 11 is configured to support yoke 17 having magnet 15, in inner periphery section 11b. Outer periphery section 11c is formed continuously on an outer periphery side of support section 11a. Frame 11 is formed into a track shape in a planar view. Here, the track shape means a shape formed such that both ends of two straight lines are connected by arcs. Frame 11 is formed of a material such as a resin. In addition, frame 11 may be formed of a metal.

Diaphragm 12 is configured by a thin plate so that it can vibrate in a vertical direction (direction of an arrow A in FIG. 6). Diaphragm 12 has a center vibration section 12a, a voice coil mount section 12b, an edge section 12c, and a frame mount section 12d. Center vibration section 12a is formed in the center of diaphragm 12. Center vibration section 12a is formed into an arc shape which projects to a direction opposite to magnet 15 when viewed from a cross-section of diaphragm 12 in a radial direction D.

Voice coil mount section 12b is provided on an outer periphery side of center vibration section 12a. Voice coil mount section 12b is provided between center vibration section 12a and edge section 12c. Voice coil mount section 12b is circularly provided so as to surround center vibration section 12a. Voice coil mount section 12b is provided to mount voice coil 14. Voice coil mount section 12b is formed so as to be flat when viewed from the cross-section of diaphragm 12 in radial direction D. There is a difference in level between voice coil mount section 12b and a part continued to center vibration section 12a.

Edge section 12c is provided on an outer periphery side of voice coil mount section 12b. Frame mount section 12d is provided on an outer periphery side of edge section 12c. Frame mount section 12d is mounted in support section 11a of frame 11. Frame mount section 12d is circularly provided so as to surround edge section 12c. Frame mount section 12d is formed so as to be flat when viewed from the cross-section of diaphragm 12 in radial direction D.

Diaphragm 12 is formed into a track shape in a planar view. Diaphragm 12 is made of a material such as PET (polyethylene terephthalate), PEN (polyethylene naphthalate), or PEI (polyether imide).

Voice coil 14 is mounted in diaphragm 12 such that an upper surface of voice coil 14 is fixed to voice coil mount section 12b of diaphragm 12. Voice coil 14 is formed into a track shape. A lead 18 is electrically connected to voice coil 14.

Magnet 15 is arranged in an inner periphery side of voice coil 14 at a distance from an inner periphery of voice coil 14

(internal magnet type). Magnet 15 is arranged so as to be opposed to voice coil 14. Yoke 17 has a section (outer periphery side section) arranged on an outer periphery side of voice coil 14 at a distance from an outer periphery of voice coil 14, and a section (lower side section) arranged on a lower side of voice coil 14 and magnet 15.

Yoke 17 is fixed by engaging with inner periphery section 11b of frame 11, in an outer periphery of the outer periphery side section. The lower side section of yoke 17 is arranged at a distance from the lower surface of voice coil 14. Magnet 15 is arranged in a center of the lower side section of yoke 17. Plate 16 is arranged on an upper surface of magnet 15. These magnet 15, plate 16, and yoke 17 constitute a magnet circuit.

Speaker unit side terminal 21 is provided so as to project from frame 11. Speaker unit side terminal 21 is connected to lead 18 with a solder 19. Thus, speaker unit side terminal 21 is electrically connected to voice coil 14 by lead 18.

Next, an operation of a speaker unit in this embodiment will be described.

In speaker unit 10, a magnetic flux generated from magnet 15 is guided by plate 16 and yoke 17, and converges to a void of voice coil 14, whereby a magnetic field is generated. Thus, when an alternate current flows in voice coil 14, voice coil 14 vertically vibrates by the alternate current flowing in voice coil 14 and the magnetic field generated from magnet 15, based on Fleming's left-hand rule. Therefore, diaphragm 12 mounted in voice coil 14 vibrates. Thus, an electric signal (alternate current) is converted to a sound (vibration).

With reference to FIGS. 2 and 3, speaker unit 10 is housed in internal space 4 of box 2, and a rear surface of diaphragm 12 is arranged in internal space 4 of box 2. Thus, a sound produced from the rear surface of diaphragm 12 is blocked by box 2. Therefore, a sound produced from a front surface of diaphragm 12 is prevented from interfering with the sound produced from the rear surface. Thus, since the sound interference can be prevented, a sound quality can be improved.

In addition, according to this embodiment, since space region 6 is provided in internal space 4, the volume of box 2 can be larger than the volume in a case where space region 6 is not provided. Thus, the vibration of diaphragm 12 can be prevented from being hindered by air resistance in box 2. Thus, the sound quality can be further improved.

Figure 8:
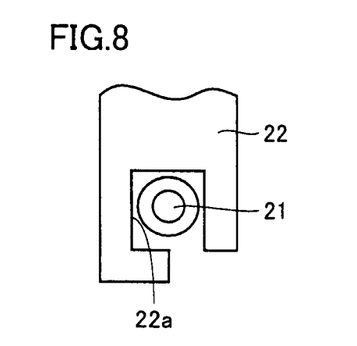
FIG. 8 is a schematic plan view showing an arrangement of a box side terminal and a speaker unit side terminal of a variation 1 of the speaker in the first embodiment of the present invention.
Figure 9:
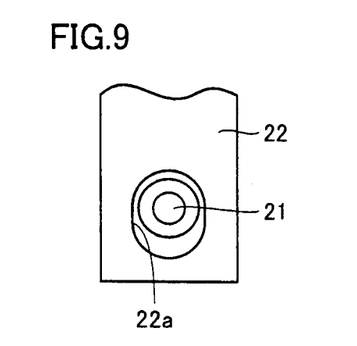
FIG. 9 is a schematic plan view showing an arrangement of a box side terminal and a speaker unit side terminal of a variation 2 of the speaker in the first embodiment of the present invention.

In the above, the description has been made of the case where an inner periphery section 22a of the one end of box side terminal 22 is formed into the recessed shape as shown in FIG. 7, but the shape of the one end of box side terminal 22 is not limited to this. With reference to FIG. 8, according to a variation 1 of this embodiment, inner periphery section 22a of the one end of box side terminal 22 may be formed into a rectangular shape having a notch in a part of four sides. In addition, with reference to FIG. 9, according to a variation 2 of this embodiment, inner periphery section 22a of the one end of box side terminal 22 may be formed into an elliptic shape. In this case, box side terminal 22 serving as the second terminal surrounds the whole outer periphery of projection 21a of speaker unit side terminal 21 serving as the first terminal.

Figure 10:
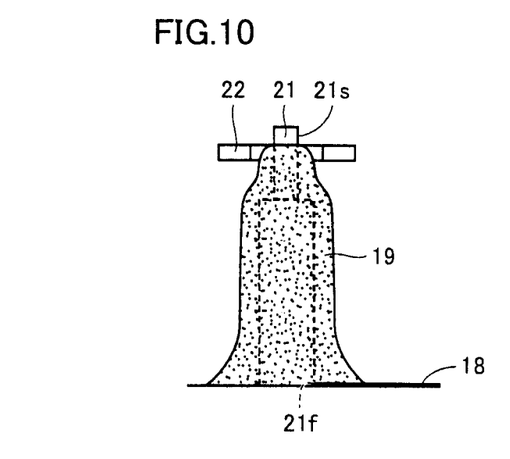
FIG. 10 is a schematic plan view showing an arrangement of a speaker unit side terminal and a box side terminal connected to a lead with soldering in the speaker in the first embodiment of the present invention.

In the above, as shown in FIG. 6, speaker unit side terminal 21 and lead 18 are connected by solder 19. With reference to FIG. 10, when speaker unit side terminal 21 and lead 18 are connected with soldering, solder 19 flows up to an upper end side of speaker unit side terminal 21 in some cases.

According to this embodiment, projection 21a of speaker unit side terminal 21 serving as the first terminal has a first section 21f positioned on a side electrically connected to voice coil 14, and a second section 21s positioned on a side of box side terminal 22 serving as the second terminal on the other side of first section 21f and having at least both sides surrounded and sandwiched by box side terminal 22 serving as the second terminal. A diameter of second section 21s is configured to be smaller than a diameter of first section 21f.

As shown in FIG. 10, even when solder 19 flows up to the upper end side of speaker unit side terminal 21 at the time of soldering, solder 19 does not prevent box side terminal 22 from being inserted because the diameter of second section 21s is smaller than the diameter of first section 21f.

In addition, in the above, the description has been made of the case where even when solder 19 flows up to the upper end side of speaker unit side terminal 21 as shown in FIG. 10, speaker unit side terminal 21 and box side terminal 22 can be connected with solder 19, but solder 19 may be prevented from climbing up by speaker unit side terminal 21.

Figure 11:
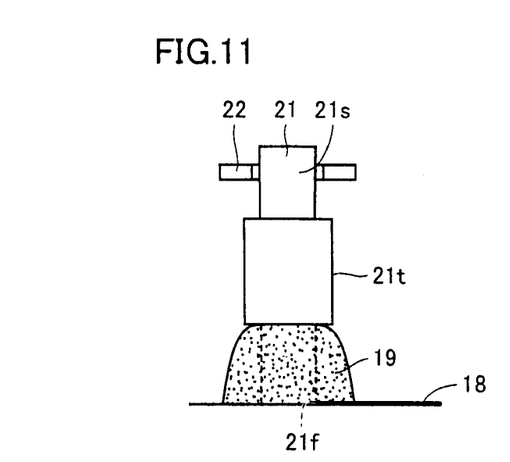
FIG. 11 is a schematic plan view showing an arrangement of a speaker unit side terminal and a box side terminal connected to a lead with soldering in a variation 3 in the speaker in the first embodiment of the present invention.

With reference to FIG. 11, according to a variation 3 of this embodiment, projection 21a of speaker unit side terminal 21 serving as the first terminal has first section 21f positioned on the side electrically connected to voice coil 14, second section 21s positioned on the side of box side terminal 22 serving as the second terminal on the other side of first section 21f, and having at least both sides surrounded and sandwiched by box side terminal 22 serving as the second terminal, a third section 21t arranged between first section 21f and second section 21s. A diameter of third section 21t is configured to be larger than the diameter of first section 21f and the diameter of second section 21s.

Since the diameter of third section 21t is configured to be larger than the diameter of first section 21f and the diameter of second section 21s, third section 21t can prevent solder 19 from climbing up when speaker unit side terminal 21 is connected to lead 18 with soldering.

In addition, in the above, the description has been made of the internal magnet type speaker unit, but this embodiment can be applied to an external type speaker unit in which magnet 15 is arranged on the outer periphery side of voice coil 14. In addition, this embodiment can be applied to a horizontal type speaker unit in which voice coil 14 is formed so as to become large in a width direction instead of a thickness direction and arranged on one surface of magnet 15.

In addition, in the above, the description has been made of the case the speaker unit is formed into the track shape, but the speaker unit may be formed into a circular shape or an elliptic shape.

Next, an operation effect of the speaker in this embodiment will be described.

According to speaker 1 in this embodiment, speaker unit side terminal 21 serving as the first terminal has projection 21a, and box side terminal 22 serving as the second terminal surrounds and sandwiches the outer periphery of projection 21a from at least both sides. Therefore, even when speaker unit side terminal 21 and box side terminal 22 shift in the extending direction of projection 21a of speaker unit side terminal 21, a distance between them is prevented from shifting. Therefore, the shift of speaker unit side terminal 21 and box side terminal 22 in the extending direction of projection 21a can be allowed. Therefore, the preferable soldering can be performed without requiring high mount precision and dimensional precision to speaker unit side terminal 21 and box side terminal 22 in the extending direction of projection 21a.

In addition, since box side terminal 22 surrounds and sandwiches the outer periphery of projection 21a from at least both ends, the distance between them is prevented from shifting even when speaker unit side terminal 21 and box side terminal 22 shift in the direction intersecting with the extending direction of projection 21a of speaker unit side terminal 21. Therefore, the shift of speaker unit side terminal 21 and box side terminal 22 in the direction intersecting with the extending direction of projection 21a can be allowed. Therefore, the preferable soldering can be performed without requiring high mount precision and dimensional precision to speaker unit side terminal 21 and box side terminal 22 in the direction intersecting with the extending direction of projection 21a. Thus, workability can be improved. Furthermore, a soldering quality can be improved. As a result, a conduction defect can be prevented.

In addition, since box 2 has box side terminal 22 arranged in casing 3 so as to be in close contact with casing 3, and projecting to internal space 4, it is not necessary to lead out a wire connected to speaker unit 10 from the inside of box 2 through the hole provided in box 2 as is conventionally performed. Since it is not also necessary to hermetically seal the hole with the bonding agent after the wire has been led out, the workability can be improved.

In addition, since it is not necessary to lead out the wire connected to speaker unit 10 from the inside of the box through the hole provided in box 2 as is conventionally performed, the sound quality can be prevented from becoming unstable due to sound interference which is generated when an amount of a bonding agent is small and hermetical sealing is insufficient at the time of hermetically sealing the hole with the bonding agent. Meanwhile, the sound quality can be prevented from becoming unstable due to the fact that the amount of the bonding agent is excessive and a volume ratio of the bonding agent increases in box 2. Thus, the sound quality is improved.

In addition, under the condition that speaker unit 10 is housed in internal space 4, speaker unit side terminal 21 has projection 21a in internal space 4, and box side terminal 22 surrounds and sandwiches the outer periphery of projection 21a from at least both sides. Therefore, it is not necessary to perform an operation to route a wire in internal space 4 as is conventionally performed. Since it is not necessary to perform the wire routing operation which needs many processes, the workability can be improved.

In addition, since there is no abnormal sound which is generated when the routed wire comes in contact with speaker unit 10 and box 2, the sound quality can be improved.

In addition, since the volume of the internal space is not reduced by the volume of the routed wire, a sound pressure can be prevented from deteriorating, a sound pressure can be prevented from deteriorating. Therefore, the sound quality can be improved.

Since the number of the processes is smaller than the case where both ends of the wire are connected as is conventionally performed, the workability can be improved.

In addition, speaker unit side terminal 21 has projection 21a in internal space 4, and box side terminal 22 surrounds and sandwiches the outer periphery of projection 21a from at least both ends. Therefore, speaker unit side terminal 21 and box side terminal 22 are arranged in internal space 4. Thus, a space can be saved.

In addition, the following conventional conduction defects can be prevented, that is, the conduction defect caused by the separation of the contact point of the spring piece due to the vibration, the conduction defect caused by the plastic deformation of the spring piece, and the conduction defect caused by the stain of the contact point of the spring piece. In addition, the mount position can be prevented from shifting due to the reaction force of the spring piece. Therefore, when speaker unit 10 is mounted in box 2, there is no need to provide a mechanism or an operation to hold a position of the spring piece so as to prevent the above conduction defect and to prevent the mount position from shifting. In addition, it is not necessary to limit a position of the rear hole of frame 11 and enlarge an outer diameter of frame 11 to ensure an area for the spring piece. Thus, the space can be saved. In addition, since the above operation is not needed, the workability can be improved.

In addition, according to speaker 1 in this embodiment, box side terminal 22 may surround the whole outer periphery of projection 21a of speaker unit side terminal 21. In this case, the shift of speaker unit side terminal 21 and box side terminal 22 can be further allowed. Therefore, the workability can be further improved.

Furthermore, according to speaker 1 in this embodiment, speaker unit side terminal 21 may be the first terminal, and box side terminal 22 may be the second terminal. Thus, since speaker unit side terminal 21 has projection 21a, the extending direction of projection 21 coincides with a thickness direction of speaker 1. Thus, the preferable soldering can be implemented without requiring high mount precision and dimensional precision in speaker unit side terminal 21 and box side terminal 22 in the thickness direction of speaker 1. Therefore, the preferable soldering can be performed on box side terminal 10 having different heights in same box 2. Thus, the workability can be improved. In addition, the soldering quality can be improved. Therefore, the workability can be improved. In addition, same box 2 can be used for speaker unit 10 having different heights. Therefore, cost can be reduced.

In addition, since the extending direction of projection 21a coincides with the thickness direction of speaker 1, an occupancy of a projected area of speaker unit side terminal 21 viewed from the extending direction of projection 21a can be small. Therefore, the position of the rear hole of frame 11 can be prevented from being limited. Thus, the workability can be improved.

In addition, according to speaker 1 in this embodiment, projection 21a of speaker unit side terminal 21 may have first section 21f positioned on the side electrically connected to voice coil 14, and second section 21s positioned on the side of box side terminal 22 on the other side of first section 21f, and having at least both sides surrounded and sandwiched by box side terminal 22. In this case, the diameter of second section 21s is configured to be smaller than the diameter of first section 21f. Since the diameter of second section 21s is configured to be smaller than the diameter of first section 21f, the solder does not prevent box side terminal 22 from being inserted even when the solder flows up to the upper end side of speaker unit side terminal 21 at the time of connecting voice coil 14 and first section 21f of speaker unit side terminal 21 with soldering.

In addition, according to speaker 1 in this embodiment, since projection 21a of speaker unit side terminal 21 may have first section 21f positioned on the side electrically connected to voice coil 14, second section 21s positioned on the side of box side terminal 22 on the other side of first section 21f, and having at least both sides surrounded and sandwiched by box side terminal 22, third section 21t arranged between first section 21f and second section 21s. In this case, the diameter of third section 21t is configured to be larger than the diameter of first section 21f and the diameter of second section 21s. Since the diameter of third section 21t is configured to be larger than the diameter of first section 21f and the diameter of second section 21s, third section 21t can prevent solder 19 from climbing up when voice coil 14 and first section 21f of speaker unit side terminal 21 are connected with soldering.

In addition, according to speaker 1 in this embodiment, box 2 includes first box unit 2a having speaker unit 10, and second box unit 2b which can engage with first box unit 2a and close internal space 4 under the condition that speaker unit 10 is housed in internal space 4.

Since box 2 includes first box unit 2a, and second box unit 2b which can engage with first box unit 2a and close internal space 4 under the condition that speaker unit 10 is housed in internal space 4, box 2 can close internal space 4 under the condition that speaker unit 10 is arranged in internal space 4. Therefore, speaker unit 10 can be easily mounted in internal space 4, and internal space 4 can be easily closed. Thus, the workability can be improved.

(Second Embodiment)

First, a configuration of a portable information terminal according to this embodiment will be described. In this embodiment, a portable information terminal having the speaker unit according to the first embodiment will be described.

Figure 12:
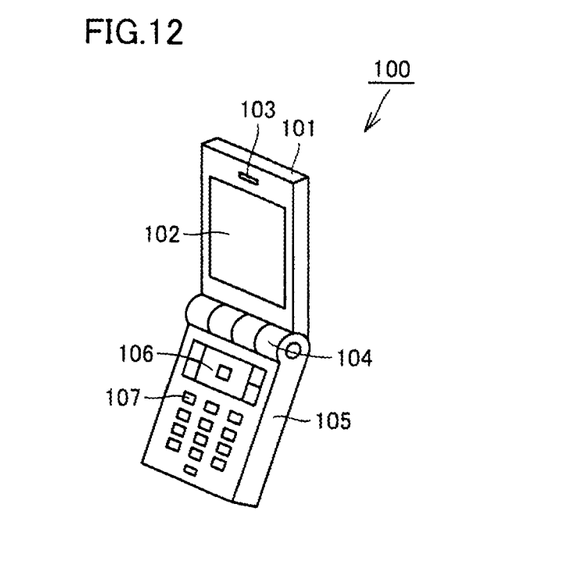
FIG. 12 is a schematic perspective view of a portable information terminal in a second embodiment of the present invention.
Figure 13:
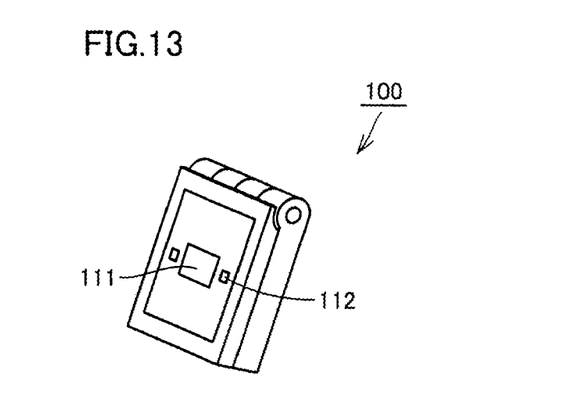
FIG. 13 is a schematic perspective view showing a state in which the portable information terminal is folded in the second embodiment of the present invention.

With reference to FIGS. 12 and 13, a portable information terminal 100 in this embodiment serves as a mobile phone and mainly includes an upper casing 101, a display 102, a sound ejection hole 103, a hinge 104, a lower casing 105, an operation button 106, a numeric button 107, a display 111, a sound ejection hole 112, and the speaker (not shown) according to the first embodiment.

With reference to FIG. 12, display 102 is provided on a front surface of upper casing 101. Sound ejection hole 103 is formed in one end side of the front surface of upper casing 101. Hinge 104 is formed in the other end side of upper casing 101. Hinge 104 is formed in one end side of lower casing 105. Upper casing 101 and lower casing 105 are connected by hinge 104 such that they can be opened and closed. Operation button 106 is formed on a front surface of lower casing 105 on a side of hinge 104. Numeric buttons 107 are formed toward an opposite side of hinge 104 from operation button 106.

With reference to FIG. 13, display 111 is provided on a back surface of upper casing 101. Sound ejection hole 112 is formed beside display 111.

The speaker (not shown) in the first embodiment is provided in an inner side of upper casing 101. Sound is generated from the speaker to an outside of portable information terminal 100 through sound ejection holes 103 and 112 mainly. Next, an operation effect of the portable information terminal in this embodiment will be described.

According to portable information terminal 100 in this embodiment, since portable information terminal 100 includes the speaker unit according to the first embodiment, the same operation effect as that of the first embodiment is provided.

In addition, since the speaker according to the first embodiment is provided, a space of portable information terminal 100 can be saved by saving the space in the speaker. In addition, a degree of freedom of design can be improved.

In addition, the description has been made of the case where the portable information terminal is the mobile phone in this embodiment, but it may be a smartphone, PDA (Personal Digital Assistants), game machine, or a personal computer.

In addition, the above embodiments can be appropriately combined.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A speaker, comprising:
   a speaker unit having a diaphragm, a voice coil mounted in said diaphragm, a magnet arranged so as to be opposed to said voice coil, a frame which supports said magnet and said diaphragm, and a speaker unit side terminal which is electrically connected to said voice coil and projects from said frame; and
   a box including a casing having an internal space to house said speaker unit, and a box side terminal which is arranged in said casing so as to be in close contact with said casing and to project towards said internal space,
   wherein said speaker unit is housed in said internal space, a first terminal serving as one of said speaker unit side terminal and said box side terminal has a projection in said internal space, a second terminal serving as the other thereof surrounds and sandwiches an outer periphery of said projection from at least both sides, and said first terminal and said second terminal are electrically connected with soldering.

2. The speaker according to claim 1, wherein said second terminal surrounds the whole outer periphery of said projection of said first terminal.

3. The speaker according to claim 1, wherein said speaker unit side terminal is said first terminal, and said box side terminal is said second terminal.

4. The speaker according to claim 3, wherein said projection of said first terminal includes:
   a first section positioned on a side electrically connected to said voice coil; and
   a second section positioned on a side with said second terminal, on an opposing side from said first section, and having at least both sides surrounded and sandwiched by said second terminal, and wherein
   a diameter of said second section is configured to be smaller than a diameter of said first section.

5. The speaker according to claim 3, wherein said projection of said first terminal includes:
   a first section positioned on a side electrically connected to said voice coil;
   a second section positioned on a side with said second terminal, on an opposing side from said first section, and having at least both sides surrounded and sandwiched by said second terminal; and
   a third section arranged between said first section and said second section, and
   a diameter of said third section is configured to be larger than a diameter of said first section and a diameter of said second section.

6. The speaker according to claim 1, wherein said box includes:
   a first box unit which mounts said speaker unit; and
   a second box unit which can engage with said first box unit, and close said internal space where said speaker unit is housed.

7. A portable information terminal comprising the speaker according to claim 1.

* * * * *